(12) United States Patent
Lee et al.

(10) Patent No.: US 11,813,567 B1
(45) Date of Patent: Nov. 14, 2023

(54) METHOD OF AND DEVICE FOR REMOVING NITROGEN OXIDE IN GAS

(71) Applicant: KOREA INSTITUTE OF SCIENCE AND TECHNOLOGY, Seoul (KR)

(72) Inventors: Dong Ki Lee, Seoul (KR); Hyun Joo Lee, Seoul (KR); Seojung Han, Seoul (KR); Heesung Eum, Seoul (KR); Seokhyeon Cheong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/956,206

(22) Filed: Sep. 29, 2022

(30) Foreign Application Priority Data

Mar. 18, 2022 (KR) ........................ 10-2022-0034057

(51) Int. Cl.
*B01D 53/32* (2006.01)
*B01D 53/56* (2006.01)
*B01D 53/75* (2006.01)
*B01D 53/78* (2006.01)

(52) U.S. Cl.
CPC ........... *B01D 53/56* (2013.01); *B01D 53/326* (2013.01); *B01D 53/75* (2013.01); *B01D 53/78* (2013.01); *B01D 2257/404* (2013.01)

(58) Field of Classification Search
CPC ...... B01D 53/56; B01D 53/326; B01D 53/78; B01D 53/75; B01D 2257/404; B01D 2251/90; B01D 2251/902; B01D 2258/0283; B01J 2219/0807
See application file for complete search history.

(56) References Cited

U.S. PATENT DOCUMENTS 3,984,522 A * 10/1976 Saito ...................... B01D 53/56
423/351

FOREIGN PATENT DOCUMENTS

| CN | 111 172 197 A | * | 5/2020 | ............. B01D 53/56 |
| CN | 112 516 793 A | * | 3/2021 | ............. B01D 53/96 |
| CN | 112 742 190 A | * | 5/2021 | ............. B01D 53/96 |
| CN | 113 967 407 A | * | 1/2022 | ............. B01D 53/79 |
| KR | 2017 0 021713 A | * | 2/2017 | ........... B01D 53/326 |

* cited by examiner

*Primary Examiner* — Timothy C Vanoy
(74) *Attorney, Agent, or Firm* — NSIP Law

(57) ABSTRACT

Provided is a device for removing nitrogen oxide, the device including an inflow path for gas containing nitrogen oxide; and a reversible metal complex compound coming into contact with the gas containing nitrogen oxide which is introduced through the inflow path, wherein the reversible metal complex compound includes a central metal ion reacting and binding with nitrogen oxide; and a ligand coordinating with the central metal ion, wherein when the central metal ion is oxidized, the bound nitrogen oxide is separated, and the oxidized central metal ion is reduced to recombine with nitrogen oxide.

9 Claims, 5 Drawing Sheets

[FIG. 1]
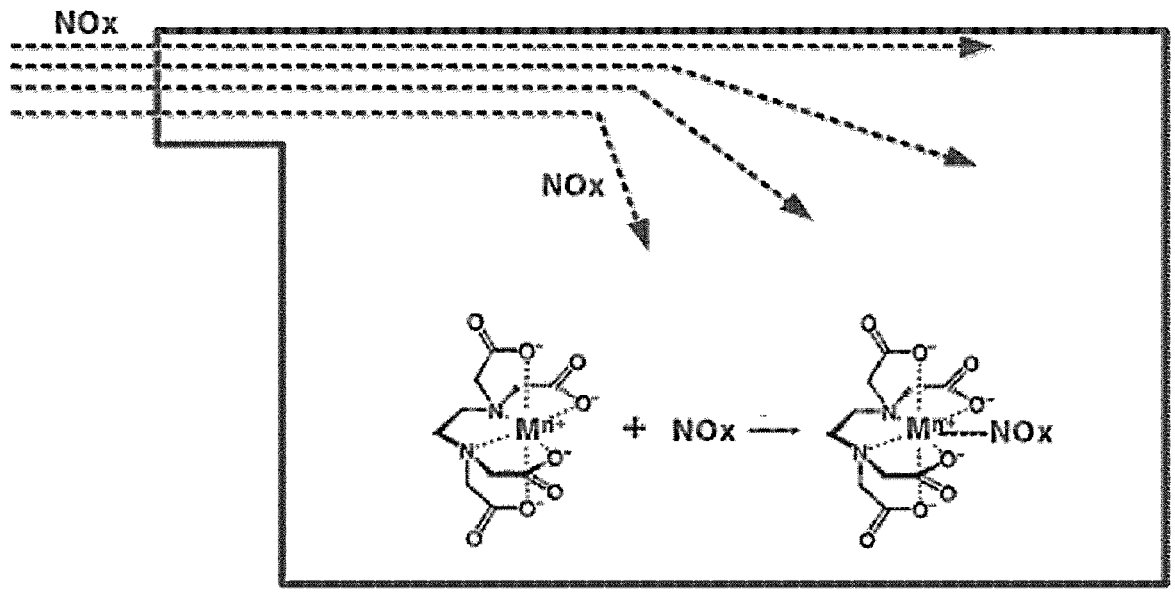
[FIG. 2]
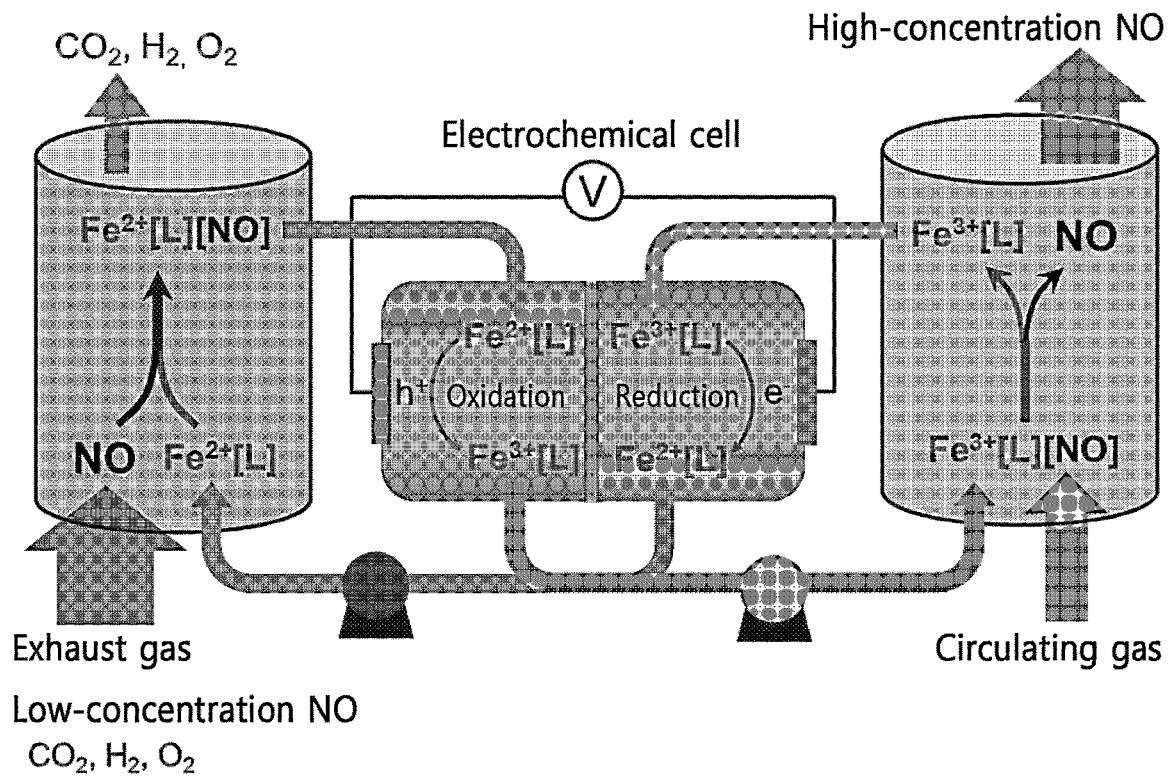

[FIG. 3]
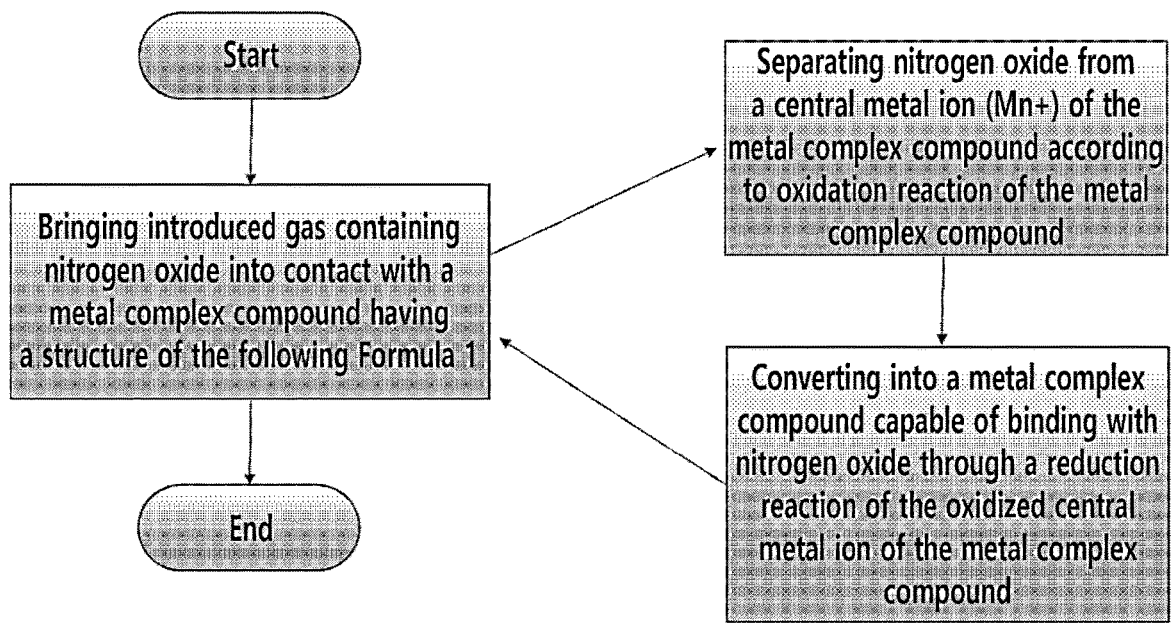

[FIG. 4]
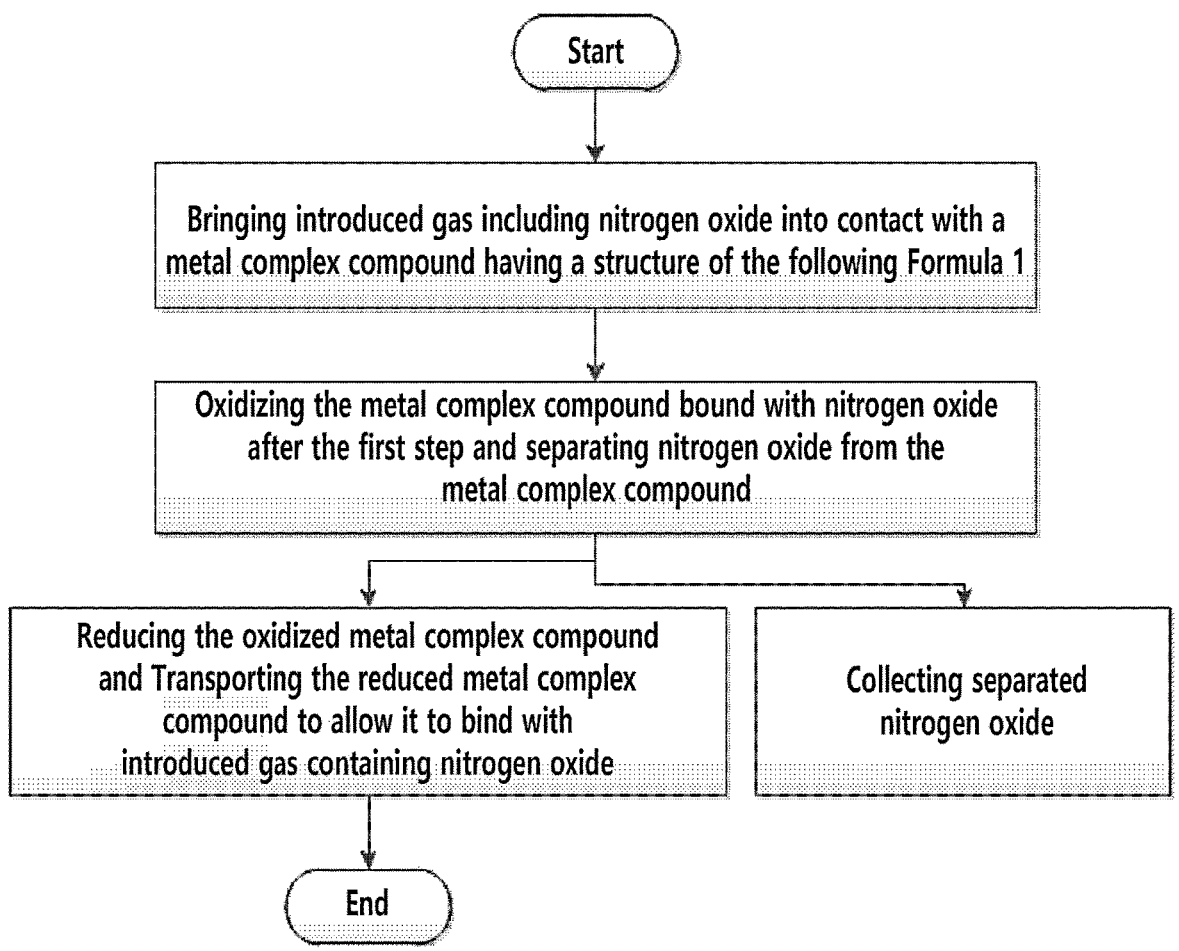

[FIG. 5A]
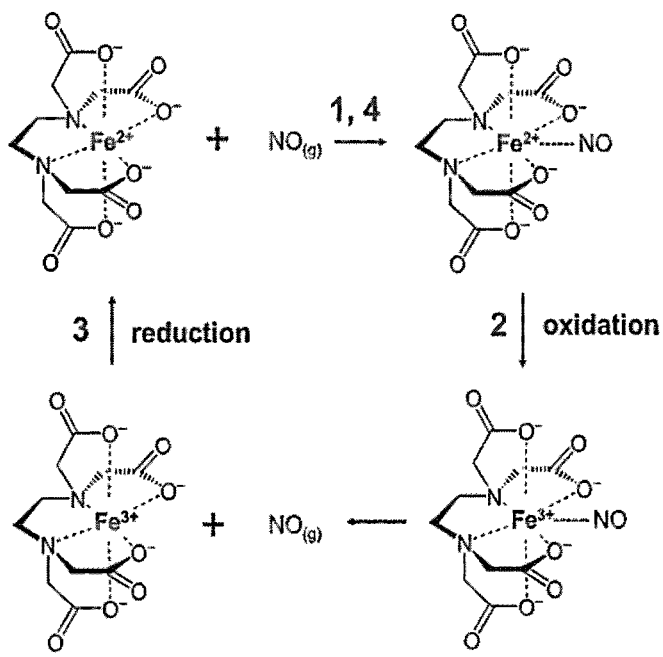
[FIG. 5B]
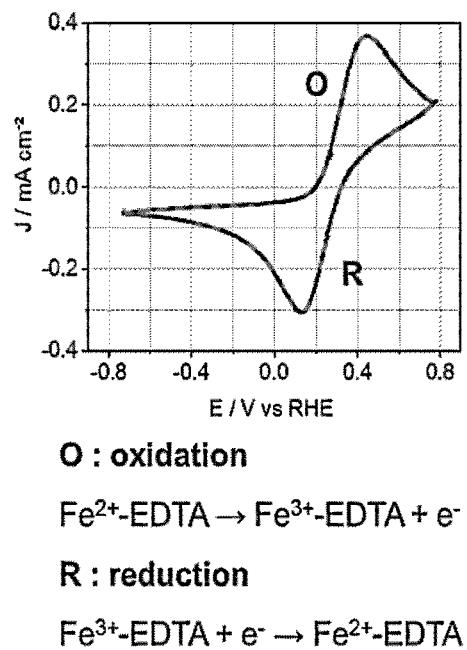
O : oxidation
$Fe^{2+}\text{-EDTA} \rightarrow Fe^{3+}\text{-EDTA} + e^-$
R : reduction
$Fe^{3+}\text{-EDTA} + e^- \rightarrow Fe^{2+}\text{-EDTA}$

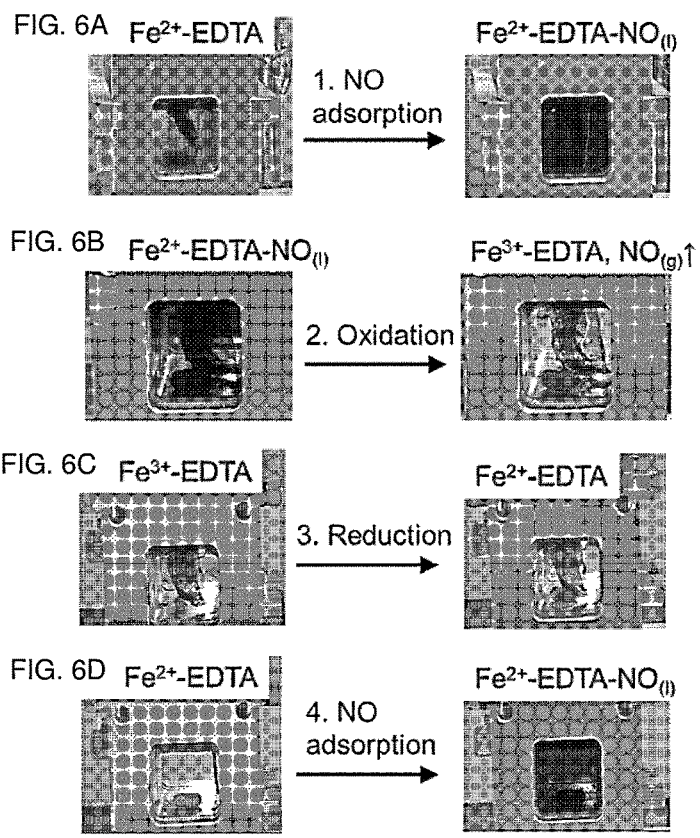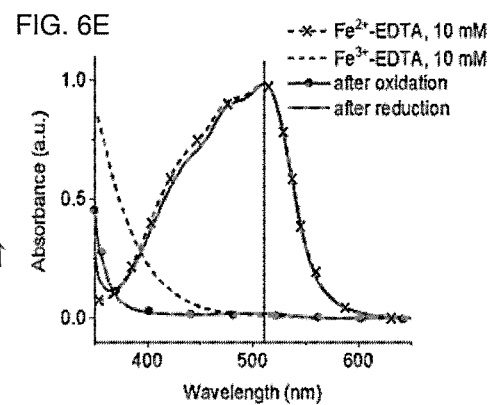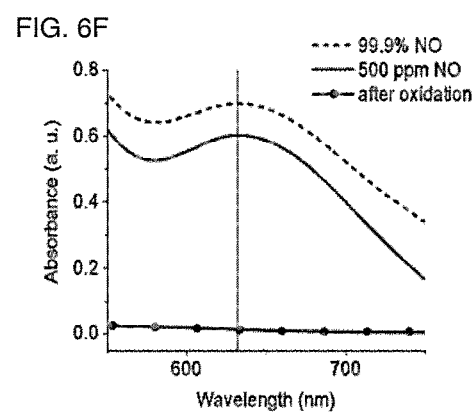

METHOD OF AND DEVICE FOR REMOVING NITROGEN OXIDE IN GAS

CROSS-REFERENCE TO RELATED APPLICATIONS

This application claims the benefit under 35 USC 119(a) of Korean Patent Application No. 10-2022-0034057 filed on Mar. 18, 2022, in the Korean Intellectual Property Office, the entire disclosure of which is incorporated herein by reference for all purposes.

BACKGROUND OF THE INVENTION

1. Field of the Invention

The present invention relates to a method of and a device for removing nitrogen monoxide in gas.

2. Description of the Related Art

Nitrogen oxide ($NO_x$) is a type of air pollutant and is generally affected by temperature during combustion and binds with oxygen to form various nitrogen oxides ($NO_2$, NO, $N_2O$, $N_2O_3$, $N_2O_4$, $N_2O_5$), and thus these are collectively referred to as $NO_x$. The higher the combustion temperature, the more nitric oxide is generated, and the main source is exhaust gas from boilers in places of business, thermoelectric power plants, vehicles, etc. Because the global warming potential (GWP) of $N_2O$ is 310 times higher than that of equivalent amount of $CO_2$, the nitrogen oxides removal is crucial to achieve carbon neutrality.

Traditionally, to remove the above-mentioned nitrogen oxide, two methods have been largely used. The first method is a selective non-catalytic reduction (SNCR) method, which converts NO into $N_2$, $CO_2$, and $H_2O$ by spraying ammonia or urea at about 1000° C. into nitrogen oxide gas. The NO removal efficiency of the selective non-catalytic reduction method is about 50%, and there is an advantage in that the equipment is simple. However, in the selective non-catalytic reduction method, unreacted ammonia or urea is released into the atmosphere, or ammonium salts ($NH_4HSO_4$, $NH_4Cl$, $NH_4HSO_3$) are generated by side reactions, which may cause problems such as white smoke, plugging, etc.

A second method is a selective catalytic reduction (SCR) method, which converts NO into $N_2$ and $H_2O$ at about 300° C. using a mixed catalyst of $V_2O_5/TIO_2$. The NO removal efficiency of the selective catalytic reduction method is about 90%, and there is an advantage in that its control is easy and stable, as compared to the selective non-catalytic reduction (SNCR) method. However, there are disadvantages in that ammonium salts are generated by side reactions, the catalyst surface is poisoned, causing deterioration in performance, the initial investment cost is high, and the catalyst exchange cost is continuously generated.

An object of the present invention is to provide a sustainable and eco-friendly nitrogen oxide treatment method which is operated under ambient temperature/pressure conditions, the method capable of solving the problems of the existing methods of removing nitrogen oxide, such as the generation of harmful by-products and the cost of additional catalyst replacement.

SUMMARY OF THE INVENTION

According to one exemplary embodiment of the present invention, there is provided a reusable metal complex compound including a central metal ion reacting and binding with nitrogen oxide; and a ligand coordinating with the central metal ion, wherein when the central metal ion is oxidized, the bound nitrogen oxide is separated, and the oxidized central metal ion is reduced to recombine with nitrogen oxide.

According to one exemplary embodiment of the present invention, there is provided the metal complex compound wherein the central metal ion includes an iron ion.

According to one exemplary embodiment of the present invention, there is provided the metal complex compound, wherein the ligand includes at least one selected from the group consisting of ethylene-diamine-tetraacetic acid (EDTA), sodium 2,3-dimercaptopropanesulfonate (DMPS), cysteic acid (CA), (methyl-pyridine-2-ylmethyl-amino)-acetic acid (MPMAA), triphenylphosphine-3,3,3"-trisulfonic acid trisodium (TPPTS), and m-sulfonated 1,2-bis(diphenylphosphino)ethane (DPPETS).

According to one exemplary embodiment of the present invention, there is provided a device for removing nitrogen oxide, the device including an inflow path for gas containing nitrogen oxide; and a reversible metal complex compound coming into contact with the gas containing nitrogen oxide which is introduced through the inflow path, wherein the metal complex compound includes a central metal ion reacting and binding with nitrogen oxide, and a ligand coordinating with the central metal ion, wherein when the central metal ion is oxidized, the bound nitrogen oxide is separated, and the oxidized central metal ion is reduced to recombine with nitrogen oxide.

According to one exemplary embodiment of the present invention, there is provided the device for removing nitrogen oxide, wherein the metal complex compound is provided in an aqueous solution state.

According to one exemplary embodiment of the present invention, there is provided the device for removing nitrogen oxide, wherein the metal complex compound is provided inside an electrochemical cell including an anode; a cathode; and a ion-exchange membrane between the anode and the cathode.

According to one exemplary embodiment of the present invention, there is provided the device for removing nitrogen oxide, wherein the central metal ion bound with nitrogen oxide in the metal complex compound is oxidized at the anode side, and the nitrogen oxide dissociated by oxidation of the central metal ion is collected outside the electrochemical cell.

According to one exemplary embodiment of the present invention, there is provided the device for removing nitrogen oxide, wherein the oxidized central metal ion in the metal complex compound is reduced at the cathode side, and the metal complex compound including the reduced central metal ion is transported to the cathode compartment of the electrochemical cell to allow it to bind with nitrogen oxide.

According to one exemplary embodiment of the present invention, there is provided a method of removing nitrogen oxide, the method including a first step of bringing gas containing nitrogen oxide into contact with a metal complex compound, wherein when the metal complex compound comes into contact with nitrogen oxide, the nitrogen oxide binds with a central metal ion of the metal complex compound, wherein the metal complex compound includes the central metal ion reacting and binding with nitrogen oxide; and a ligand coordinating with the central metal ion, wherein when the central metal ion is oxidized, the bound nitrogen oxide is separated, and the oxidized central metal ion is reduced to recombine with nitrogen oxide.

According to one exemplary embodiment of the present invention, there is provided the method of removing nitrogen oxide, the method further including a second step of oxidizing the metal complex compound bound with nitrogen oxide after the first step and separating the nitrogen oxide from the oxidized central metal ion; and a third step of collecting the separated nitrogen oxide.

According to one exemplary embodiment of the present invention, there is provided the method of removing nitrogen oxide, wherein, in the second step, the step of oxidizing the metal complex compound bound with nitrogen oxide and the step of separating the nitrogen oxide from the metal complex compound are performed at different locations.

According to one exemplary embodiment of the present invention, there is provided the method of removing nitrogen oxide, the method further including a fourth step of reducing the oxidized metal complex compound after the second step and transporting the reduced metal complex compound to bring it into contact with the introduced gas containing nitrogen oxide.

According to one exemplary embodiment of the present invention, there is provided the method of removing nitrogen oxide, wherein the first step to the fourth step are repeated a plurality of times.

BRIEF DESCRIPTION OF THE DRAWINGS

FIG. 1 is a schematic illustration of a device for removing nitrogen oxide according to one exemplary embodiment of the present invention;

FIG. 2 is an illustration focusing on an operating method of the device for removing nitrogen oxide according to one exemplary embodiment of the present invention;

FIG. 3 is a flow chart illustrating a method of removing nitrogen oxide according to one exemplary embodiment of the present invention;

FIG. 4 is a flow chart illustrating a method of removing nitrogen oxide according to another exemplary embodiment of the present invention;

FIGS. 5A and 5B illustrate oxidation/reduction of a metal complex compound according to one exemplary embodiment of the present invention, and an association/dissociation cycle thereof with nitrogen oxide; and FIGS. 6A to 6F show results of spectrometric analysis for association/dissociation of nitrogen oxide and the metal complex compound according to one exemplary embodiment of the present invention.

DETAILED DESCRIPTION OF THE PREFERRED EMBODIMENTS

Hereinafter, exemplary embodiments of the present invention will be described in detail with reference to the accompanying drawings and contents described in the accompanying drawings, but the present invention is not restricted or limited by the exemplary embodiments.

The terms used in this description are merely for explaining exemplary embodiments and are not intended to restrict the present invention. The singular expression may include the plural expression unless it is differently expressed contextually. The terms "comprises" and/or "comprising" when used herein specify the presence of stated components, steps, operations, and/or elements but do not preclude the presence or addition of one or more other components, steps, operations, and/or elements.

Any aspect or design described herein as an "embodiment", "example", "aspect", "exemplary", etc. is not necessarily to be construed as preferred or advantageous over other aspects or designs.

The terms used in the following description have been selected according to general and universal terms in the related technical field, but other terms may exist depending on technological development and/or changes, customs, engineer's preferences, etc. Therefore, the terms used in the following description should not be understood as limiting the technical spirit, but should be understood as exemplary terms for describing the exemplary embodiments.

Additionally, in certain cases, there may be terms arbitrarily selected by the applicant, and in this case, the meaning of the terms will be described in detail in a corresponding description paragraph. Accordingly, the terms as used herein should be interpreted based on the substantial meaning of the terms and the description throughout the specification, rather than simply the name of the terms.

Meanwhile, the terms "the first", "the second", and the like are used to describe a variety of components, but these components are limited by the terms. The terms are merely employed to differentiate a certain component from other components.

Further, when a part such as a film, layer, area, or component is referred to as being "on" or "above" another part, it may be directly on the other part, or other intervening films, layers, areas, or components may be present therebetween.

Unless otherwise defined, all terms (including technical and scientific terms) used herein may have the same meaning as commonly understood by one of ordinary skill in the art to which the present invention pertains. It will be further understood that terms, such as those defined in commonly used dictionaries, will not be interpreted in an idealized or overly formal sense unless expressly so defined herein.

Meanwhile, in the description of the present invention, when it is determined that a detailed description of known functions and configurations incorporated herein may obscure the gist of the present invention, the detailed description will be omitted herein. In addition, the terminologies used in this specification are those used to properly express exemplary embodiments of the present invention, which may vary according to a user's or operator's intention or custom in the field to which the present invention pertains. Accordingly, definitions of these terms should be made based on the content throughout this specification.

The present invention relates to a device for and a method of removing nitrogen oxide using a metal complex compound. According to the present invention, nitrogen oxide may be removed using a reversible binding reaction between a central metal of a metal complex compound and nitrogen oxide. In particular, since the above-described reversible binding reaction between the central metal and nitrogen oxide may be controlled through oxidation and reduction reactions of the metal complex compound, nitrogen oxide may be electrochemically removed without generation of harmful by-products. Furthermore, since the metal complex compound may be repeatedly used in removing nitrogen oxide, it has an advantage over the prior art which requires supplement of a catalyst/adsorbent for additional removal of nitrogen oxide.

FIG. 1 is a schematic illustration of a device for removing nitrogen oxide according to one exemplary embodiment of the present invention.

Referring to FIG. 1, a metal complex compound according to one exemplary embodiment of the present invention includes a central metal ion reacting and binding with nitrogen oxide; and a ligand coordinating with the central metal ion, wherein when the central metal ion is oxidized, the bound nitrogen oxide is separated, and the oxidized central metal ion is reduced to recombine with nitrogen oxide, and thus its reuse is possible.

Further, the device for removing nitrogen oxide includes an inflow path for gas containing nitrogen oxide; and a metal complex compound coming into contact with the gas containing nitrogen oxide which is introduced through the inflow path.

The metal complex compound includes a central metal ion reacting and binding with nitrogen oxide; and a ligand coordinating with the central metal ion.

The ligand may include at least one selected from the group consisting of ethylene-diamine-tetraacetic acid (EDTA), sodium 2,3-dimercaptopropanesulfonate (DMPS), cysteic acid (CA), (methyl-pyridine-2-ylmethyl-amino)-acetic acid (MPMAA), triphenylphosphine-3,3,3"-trisulfonic acid trisodium (TPPTS), and m-sulfonated 1,2-bis(diphenylphosphino)ethane (DPPETS).

The metal complex compound including the ligand selected from those described above may have, for example, a chemical structure as shown in Formula 1 below. The metal complex compound includes a central metal (M) and a ligand, wherein the central metal may coordinate with the ligand in the form of an ion ($M^{n+}$).

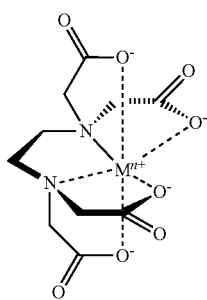

[Formula 1]

(in Formula 1, M is a central metal ion)

The ligand may exhibit a plurality of lone pairs of electrons and/or negative charges. Accordingly, a plurality of chemical bonds may be provided between the central metal ion and the ligand. Therefore, the central metal ion and the ligand are stably bound and provided, and there is no concern about separation of the central metal ion from the metal complex or the structural deformation of the ligand even when adsorption/desorption of nitrogen oxide is reversible.

As described above, the central metal ion and the ligand in the metal complex compound are stably bound and provided, and thus the processing temperature may be relatively freely determined. The removal process of nitrogen oxide may be performed even at a temperature at which proteins are denatured because nitrogen oxide is contained in a large amount in exhaust gas from boilers, thermoelectric power plants, vehicles, etc. Therefore, when materials that cannot withstand high temperatures (e.g., microorganisms, low-melting-point polymers easily deformed in structure, etc.) are used, it is impossible to directly bring them into contact with the high-temperature exhaust gas, and a cooling means for lowering the temperature of the high-temperature exhaust gas is additionally needed. There have been problems in that the costs are increased by adding and operating the cooling means, the process becomes complicated, and the nitrogen oxide removal efficiency is lowered because the chemical reactivity and kinetics of NO removal are lowered at low temperatures.

Since the metal complex compound of the present invention has a stable structure in which the central metal and the ligand are bound by a plurality of chemical bonds, the adsorption/desorption reaction of nitrogen oxide may be performed even at high temperatures.

The nitrogen oxide binding to the metal complex compound may be at least one selected from the group consisting of $NO_2$, NO, $N_2O$, $N_2O_3$, $N_2O_4$, and $N_2O_5$. A gas containing the above-described nitrogen oxide may be exhaust gas from boilers, thermoelectric power plants, vehicles, etc. The inflow path, through which the gas containing the nitrogen oxide is introduced, may be an outflow path of the above-described gases, and there is no limitation in the configuration thereof.

More closely examining the association/dissociation cycle between the metal complex compound and nitrogen oxide, since the central metal ion provided in the metal complex compound has a positive charge, it is able to easily bind with nitrogen oxide by electrostatic attraction. Therefore, when nitrogen oxide is introduced into a chamber in which the metal complex compound is provided, the central metal ion of the metal complex compound and the nitrogen oxide may spontaneously bind with each other.

Next, in a recovery process of separating the nitrogen oxide from the metal complex compound bound with the nitrogen oxide, the central metal ion in the metal complex compound is first oxidized. After the central metal ion is oxidized, the bound nitrogen oxide is separated from the oxidized central metal ion. The oxidized metal complex compound from which nitrogen oxide has been separated is reduced so that it is used again for adsorption of nitrogen oxide. Therefore, nitrogen oxide may be easily associated/dissociated from the central metal by the oxidation/reduction reaction of the metal complex compound, and nitrogen oxide may be adsorbed and collected using the same. In addition, in the process of adsorbing nitrogen oxide by the metal complex compound and the process of separating and collecting the adsorbed nitrogen oxide, other reactions than the oxidation/reduction of the metal complex compound are not involved, and accordingly, unlike in the prior art, harmful by-products are not generated. In addition, since the metal complex compound adsorbing nitrogen oxide may be reused through sequential oxidation and reduction reactions, the metal complex compound may be repeatedly used in removing nitrogen oxide.

The central metal provided in the metal complex compound may be iron ($Fe^{n+}$). Iron (Fe) may be provided by coordination with the ligand in the form of a divalent cation (ferrous ion; $Fe^{2+}$), and may be oxidized in the adsorption/desorption cycle of nitrogen oxide to exist in the form of a trivalent cation (Ferric ion; $Fe^{3+}$). Since iron(III) ions are more stable than iron(II) ions, the oxidation reaction of iron(II) ions to iron(III) ions in an aqueous solution is known to be a spontaneous reaction. Therefore, the central metal provided in the metal complex compound may spontaneously bind with nitrogen oxide in the iron(II) state, and thus nitrogen oxide adsorption by the metal complex compound may be efficiently performed.

The metal complex compound may be provided in an aqueous solution state. Accordingly, gas containing the above-described nitrogen oxide may be discharged in a form of passing through the aqueous solution of the metal complex compound. In the aqueous solution, nitrogen oxide binds with the metal complex, and only the exhaust gas from which nitrogen oxide is removed may be discharged through the aqueous solution. It is easy to perform the above-described oxidation/reduction reaction on the metal complex compound provided in the aqueous solution state.

As described above, the metal complex compound according to one exemplary embodiment of the present invention may remove nitrogen oxide without generating harmful by-products, and may be reused after separating-collecting nitrogen oxide by oxidation/reduction reaction.

As described above, a basic configuration of the device for removing nitrogen oxide, the device including the metal complex compound according to one exemplary embodiment of the present invention, has been examined. Hereinafter, another configuration of the device for removing nitrogen oxide according to another exemplary embodiment will be examined.

FIG. 2 is an illustration focusing on an operating method of the device for removing nitrogen oxide according to one exemplary embodiment of the present invention.

Referring to FIG. 2, the device for removing nitrogen oxide includes an electrochemical cell including an anode; a cathode; and a ion-exchange membrane between the anode and the cathode, wherein the metal complex compound may be provided inside the electrochemical cell.

The device for removing nitrogen oxide may include an adsorption chamber connected to the inflow path of a gas containing nitrogen oxide. The metal complex compound is provided in the adsorption chamber, and as described above, the metal complex compound and nitrogen oxide may spontaneously bind to each other ($Fe^{2+}[L]=NO \rightarrow Fe^{2+}[L][NO]$). After the nitrogen oxide is removed, the remaining gas may be discharged out of the adsorption chamber. The adsorption chamber may be provided in the form of a tank capable of accommodating the metal complex compound in the aqueous solution state, but there is no particular limitation in the configuration thereof.

The metal complex compound ($Fe^{2+}[L][NO]$) bound with nitrogen oxide in the adsorption chamber may be transported to the anode side of the electrochemical cell. At this time, a connection pipe connecting the adsorption chamber and the electrochemical cell, a pump, etc. may be further provided for transport of the metal complex compound ($Fe^{2+}[L][NO]$) bound with nitrogen oxide. The pump may periodically transport the metal complex compound from the adsorption chamber connected to the gas inlet to the electrochemical cell.

The metal complex compound ($Fe^{2+}[L][NO]$) bound with nitrogen oxide which is transported to the anode side of the electrochemical cell may be oxidized at the anode. Specifically, the central metal of the metal complex compound may be oxidized ($Fe^{2+}[L] \rightarrow Fe^{3+}[L]$). The oxidation reaction may be performed with a small amount of electrical energy of several hundreds of mV. The oxidized metal complex compound may be in the state of binding with nitrogen oxide ($Fe^{3+}[L][NO]$). The oxidized metal complex compound ($Fe^{3+}[L][NO]$) bound with nitrogen oxide may be transported to a nitrogen oxide collecting unit for collecting nitrogen oxide. Similarly, a pipe and a pump for transporting the oxidized metal complex compound ($Fe^{3+}[L][NO]$) bound with nitrogen oxide may be provided, and the pump may transport the oxidized metal complex compound, of which the oxidation reaction has been completed in connection with the operation pattern of the anode for oxidizing the metal complex compound, to the nitrogen oxide collecting unit.

In the nitrogen oxide collecting unit, nitrogen oxide is separated from the oxidized metal complex compound ($Fe^{3+}[L][NO]$) bound with nitrogen oxide. The nitrogen oxide collecting unit may also be provided in the form of a tank to accommodate the oxidized metal complex compound ($Fe^{3+}[L]$) in the aqueous solution state, but there is no particular limitation in the configuration thereof.

The nitrogen oxide collecting unit may be provided with a means for more efficiently separating nitrogen oxide from the oxidized metal complex compound ($Fe^{3+}[L][NO]$) bound with nitrogen oxide. For example, a stirrer, a sonicator, etc. may be provided, which physically impact the oxidized metal complex compound ($Fe^{3+}[L][NO]$) bound with nitrogen oxide to promote the separation between the oxidized metal complex compound ($Fe^{3+}[L]$) and nitrogen oxide. The separated nitrogen oxide may be separately collected and concentrated, and a circulation gas may flow inside the collecting unit to move the separated nitrogen oxide. After separation of nitrogen oxide, only the oxidized metal complex compound ($Fe^{3+}[L]$) remains, and the oxidized metal complex compound ($Fe^{3+}[L]$) may be transported back to the cathode side of the electrochemical cell.

The oxidized metal complex compound ($Fe^{3+}[L]$) transferred to the cathode side may be reduced by receiving electrons from the cathode ($Fe^{3+}[L]+e^- \rightarrow Fe^{2+}[L]$). The reduction reaction may be performed with a small amount of electrical energy of several hundreds of mV. The reduced metal complex compound ($Fe^{2+}[L]$) may be transferred to the chamber connected to the gas inflow path described above and used for adsorption of nitrogen oxide. Even at this time, a pipe and a pump for transporting the reduced metal complex compound ($Fe^{2+}[L]$) may be provided, and the pump may transport the reduced metal complex compound ($Fe^{2+}[L]$), of which the reduction reaction has been completed in connection with the operation pattern of the cathode for reducing the oxidized metal complex compound, to the nitrogen oxide collecting unit.

As described above, since different reactions proceed in the anode and the cathode of the electrochemical cell, a ion exchange membrane is provided inside the electrochemical cell to prevent the reactants and products provided to the anode side and the reactants and products provided to the cathode side from mixing.

With regard to the above-described configuration of the electrochemical cell, there is no limitation on the shape and material of the anode, the cathode, and the ion-exchange membrane. For example, the electrochemical cell may be provided in a prismatic or cylindrical shape, and accordingly, the anode, cathode, and separator may have shapes and materials corresponding thereto.

In addition, a solvent or electrolyte may be further provided inside the electrochemical cell, and a power supply unit may be further provided for driving the anode and the cathode. In addition to those described above, there is no limitation in the configuration of the electrochemical cell, as long as it includes the configuration corresponding to the anode, the cathode, and the ion-exchange membrane, and is able to perform oxidation and reduction reactions of the metal complex compound.

As described above, the device for removing nitrogen oxide according to one exemplary embodiment of the present invention has been described. The device for removing nitrogen oxide according to one exemplary embodiment of the present invention may be driven even with a low electric power. It is also possible to maintain the nitrogen oxide removal performance by reversibly oxidizing/reducing the metal complex compound according to cycles without additionally introducing a catalyst for the removal of nitrogen oxide.

Hereinafter, a method of removing nitrogen oxide according to one exemplary embodiment of the present invention will be described.

FIG. 3 is a flow chart illustrating the method of removing nitrogen oxide according to one exemplary embodiment of the present invention.

Referring to FIG. 3, the method of removing nitrogen oxide may include a first step of bringing gas containing nitrogen oxide into contact with the metal complex compound, wherein when the metal complex compound comes into contact with nitrogen oxide, the nitrogen oxide binds with the central metal ion of the metal complex compound, wherein the metal complex compound includes the central metal ion reacting and binding with nitrogen oxide; and the ligand coordinating with the central metal ion, wherein when the central metal ion is oxidized, the bound nitrogen oxide is separated, and the oxidized central metal ion is reduced to recombine with nitrogen oxide. With regard to the first step, the method of bringing the gas containing nitrogen oxide into contact with the metal complex compound is the same as described above. The metal complex compound may be provided in an aqueous solution state as needed, and the contacting may be performed by passing the gas containing nitrogen oxide into the aqueous solution containing the metal complex compound. However, in addition to the above-described method, various methods may be performed to bring the gas containing nitrogen oxide into contact with the metal complex compound.

The nitrogen oxide is bound to the central metal ion ($M^{n+}$) of the metal complex compound, and the nitrogen oxide is separated from the central metal ($M^{n+}$) of the metal complex compound according to the oxidation reaction of the metal complex compound. Since the content related thereto has been previously described, it is omitted herein to avoid descriptions of overlapping contents.

With regard to the above-described method of removing nitrogen oxide, a more specific exemplary embodiment for oxidation/reduction of the metal complex compound is the same as in FIG. 4.

FIG. 4 is a flow chart illustrating a method of removing nitrogen oxide according to another exemplary embodiment of the present invention.

Referring to FIG. 4, the method of removing nitrogen oxide may include a second step of oxidizing the metal complex compound bound with nitrogen oxide after the first step and separating the nitrogen oxide from the oxidized central metal ion; and a third step of collecting the separated nitrogen oxide may be further performed. In this regard, in the second step, the step of oxidizing the metal complex compound bound with the nitrogen oxide and the step of separating the nitrogen oxide from the metal complex compound may be performed at different locations.

A fourth step of reducing the oxidized metal complex compound after the second step and transporting the reduced metal complex compound to bring it into contact with the introduced gas containing nitrogen oxide may be further performed.

The above-described method of removing nitrogen oxide may be performed in various ranges of temperature without limitation in the temperature. This is because the metal complex compound of the present invention has a stable structure in which the central metal and the ligand are bound by a plurality of chemical bonds, and thus nitrogen oxide adsorption/desorption reaction may be performed even at high temperatures.

Therefore, the process of removing nitrogen oxide may be directly performed with respect to the high-temperature exhaust gas without an additional process such as cooling, etc.

FIGS. 5A and 5B illustrate oxidation/reduction of the metal complex compound according to one exemplary embodiment of the present invention, and an association/dissociation cycle thereof with nitrogen oxide.

FIG. 5A is a reaction scheme showing a cyclic reaction using a NO adsorption/desorption phenomenon according to the change in the oxidation number of a Fe-EDTA complex, and FIG. 5B is a cyclic voltammetry curve of reversible oxidation/reduction reaction of the Fe-EDTA complex through an electrochemical method.

In FIG. 5B, the reversible oxidation/reduction reaction experiment was performed using a 10 mM $Fe^{2+}$-EDTA aqueous solution, glassy carbon working electrode/counter electrode, and a $Hg/HgSO_4$ reference electrode.

Fe(II)-EDTA is characterized in that it may bind with NO gas to exist as a liquid complex of Fe(II)-EDTA-NO, but when iron ions are converted to a trivalent form, the bond with NO is broken (FIG. 5A). When exhaust gas is passed through the Fe(II)-EDTA solution using this characteristic, Fe(II)-EDTA selectively adsorbs NO among various gases in the exhaust gas, and when it is oxidized to Fe(III)-EDTA again, NO is released again, and pure NO gas may be stored where desired.

The Fe(II)/Fe(III)-EDTA oxidation/reduction reaction is reversible and may be easily controlled by way of electrochemical methods. When a graphite electrode is immersed in a Fe(II)-EDTA aqueous solution and an oxidation voltage is applied, an oxidation reaction of Fe(II)-EDTA to Fe(III)-EDTA occurs on the electrode surface, and when a reduction voltage is applied to the graphite electrode again, Fe(III)-EDTA may be reduced to Fe(II)-EDTA (FIG. 5B). This electrochemical Fe(II)/Fe(III)-EDTA oxidation/reduction reaction is reversible and may be controlled with a small amount of electrical energy of several hundreds of mV.

FIGS. 6A to 6F show results of spectrometric analysis for association/dissociation of nitrogen oxide and the metal complex compound according to one exemplary embodiment of the present invention.

Experimental Example 1. NO Adsorption/Desorption Experiment Through Electrochemical Oxidation/Reduction Reaction of Fe-EDTA Complex FIGS. 6A to 6D correspond to steps 1 to 4 of FIG. 5A, respectively.
- (a) A step of preparing a NO gas-bound liquid complex compound ($Fe^{2+}$-EDTA-$NO_{(l)}$) by injecting 500 ppm NO gas into a 10 mM $Fe^{2+}$-EDTA aqueous solution.
- (b) A step of releasing NO which is bound to the complex compound by electrochemically oxidizing $Fe^{2+}$-EDTA-$NO_{(l)}$ to be converted into $Fe^{3+}$-EDTA.
- (c) A step of converting $Fe^{3+}$-EDTA back into $Fe^{2+}$-EDTA by electrochemical reduction.
- (d) A step of preparing a NO gas-bound liquid complex compound again by injecting NO gas into the $Fe^{2+}$-EDTA solution.

(e) The result of spectrometric analysis for the oxidation number of the iron ion of the Fe-EDTA complex using 1,10-phenanthroline (dotted line: unreacted Fe-EDTA, solid line: Fe-EDTA after electrochemical oxidation (b) and reduction (c) reactions).

(f) The result of spectrometric analysis for the color change of the Fe-EDTA complex that changed with injection of NO gas (100% NO: injection of high-purity (99.9%) NO into $Fe^{2+}$-EDTA solution, 500 ppm NO: injection of 500 ppm NO gas into $Fe^{2+}$-EDTA solution, after oxidation: conversion of $Fe^{2+}$-EDTA-$NO_{(l)}$ complex formed by injection of 500 ppm NO into $Fe^{3+}$-EDTA by electrochemical oxidation).

In Experimental Example 1, the NO adsorption/desorption reaction was tested using the Fe-EDTA complex. To this end, a 10 mM $Fe^{2+}$-EDTA aqueous solution, a glassy carbon foam working electrode, a counter electrode, a $Hg/HgSO_4$ reference electrode, and 500 ppm NO gas (the same condition as the NO concentration of exhaust gas) were used.

(a) 500 ppm NO gas was passed through the $Fe^{2+}$-EDTA solution so that NO was adsorbed into the complex ($Fe^{2+}$-EDTA+NO(g)→$Fe^{2+}$-EDTA-$NO_{(l)}$).

(b) Iron ions were oxidized to trivalent by applying an oxidation voltage to the working electrode, and NO was released as a gas from the complex ($Fe^{2+}$-EDTA-$NO_{(l)}$→$Fe^{3+}$-EDTA+NO(g)+$e^-$).

(c) Iron ions were reduced to divalent by applying a reducing voltage to the working electrode ($Fe^{3+}$-EDTA+$e^-$→$Fe^{2+}$-EDTA).

(d) The NO adsorption process of (a) was repeated ($Fe^{2+}$-EDTA+$NO_{(g)}$→$Fe^{2+}$-EDTA-$NO_{(l)}$).

The completion of the reaction of each step was analyzed by spectrometry. In addition, to evaluate by an electrochemical method whether the oxidation number of the iron ion of the Fe-EDTA complex was well converted into a divalent or trivalent form, unreacted $Fe^{2+}$-EDTA, $Fe^{3+}$-EDTA, the solutions after completion of the steps b and c, were dissolved in a 1,10-phenanthroline indicator solution, and measured with a spectrometer. $Fe^{2+}$-EDTA dissolved in the indicator solution showed absorbance properties in the wavelength of 515 nm, whereas $Fe^{3+}$-EDTA showed absorbance properties in the ultraviolet region below 400 nm (FIG. 6E). The Fe-EDTA solution where step b (oxidation reaction) was completed showed absorbance properties in the region below 400 nm, like $Fe^{3+}$-EDTA. The Fe-EDTA solution where step c (reduction reaction) was completed strongly absorbed the light of 515 nm, like $Fe^{2+}$-EDTA. These results confirmed that the $Fe^{2+}/Fe^{3+}$-EDTA conversion reaction was well controlled through the electrochemical method.

Whether NO adsorption/desorption in steps a and b was also determined using the characteristic that the color of the solution changes according to adsorption of NO into the Fe-EDTA complex. The solution, in which a large amount of $Fe^{2+}$-EDTA-$NO_{(l)}$ was formed by passing 99.9% high-purity NO gas through the $Fe^{2+}$-EDTA solution, showed absorbance properties in the wavelength of 630 nm (FIG. 6F). In step a, 500 ppm NO, as the same NO concentration in the exhaust gas, was passed through $Fe^{2+}$EDTA, and it was confirmed that about 80% of $Fe^{2+}$-EDTA-$NO_{(l)}$ was formed, as compared to use of 99.9% NO gas. When the solution obtained by trivalent oxidation of iron ions in step b was measured using a spectrometer, it was observed that the absorbance properties around 630 nm disappeared, indicating that NO gas had been completely separated from the complex compound and released as a gas.

On the other hand, the exemplary embodiments of the present invention disclosed in the present specification and drawings are merely presented as specific examples to aid understanding, and are not intended to limit the scope of the present invention. It will be apparent to those of ordinary skill in the art to which the present invention pertains that other modifications based on the technical spirit of the present invention can be implemented in addition to the exemplary embodiments disclosed herein.

Effect of the Invention

According to the present invention, nitrogen oxide mixed in a gas mixture may be removed by using a metal complex compound capable of reversibly adsorbing/desorbing nitrogen oxide.

According to the present invention, there is an advantage of being environmentally friendly because no harmful by-products are generated during the process of removing nitrogen oxide.

According to the present invention, the process of removing nitrogen oxide is performed at normal temperature/pressure, and the oxidation/reduction of the metal complex compound operates reversibly, and thus it is economical in that the metal complex may be used semi-permanently.

What is claimed is:

1. A device for removing nitrogen oxide, the device comprising:
   an inflow path for gas containing nitrogen oxide; and
   a reversible metal complex compound coming into contact with the gas containing nitrogen oxide which is introduced through the inflow path,
   wherein the metal complex compound includes a central metal ion reacting and binding with nitrogen oxide; and a ligand coordinating with the central metal ion,
   wherein when the central metal ion is oxidized, the bound nitrogen oxide is separated, and the oxidized central metal ion is reduced to recombine with nitrogen oxide,
   wherein the metal complex compound is provided in an aqueous solution state,
   wherein an adsorption chamber connected to the inflow path for gas containing nitrogen oxide and the metal complex compound is provided in the adsorption chamber in the aqueous solution state,
   wherein a first connection pipe connecting the adsorption chamber and an electrochemical cell is provided,
   wherein the oxidized metal complex compound bound with nitrogen oxide is transported to a nitrogen oxide collecting unit for collecting nitrogen oxide, and
   wherein a second connection pipe connecting the nitrogen oxide collecting unit and the electrochemical cell is provided.

2. The device of claim 1, wherein the metal complex compound is provided inside an electrochemical cell including an anode; a cathode; and a ion-exchange membrane between the anode and the cathode.

3. The device of claim 2, wherein the central metal ion bound with nitrogen oxide in the metal complex compound is oxidized at the anode side, and the nitrogen oxide dissociated by oxidation of the central metal ion is collected outside the electrochemical cell.

4. The device of claim 2, wherein the oxidized central metal ion in the metal complex compound is reduced at the cathode side, and the metal complex compound including the reduced central metal ion is transported to the cathode compartment of the electrochemical cell to allow it to bind with nitrogen oxide.

5. A method of removing nitrogen oxide, the method comprising:

a first step of bringing gas containing nitrogen oxide into contact with a metal complex compound, wherein when the metal complex compound comes into contact with nitrogen oxide, the nitrogen oxide binds with a central metal ion of the metal complex compound, wherein the metal complex compound includes the central metal ion reacting and binding with nitrogen oxide; and a ligand coordinating with the central metal ion, wherein when the central metal ion is oxidized, the bound nitrogen oxide is separated, and the oxidized central metal ion is reduced to recombine with nitrogen oxide, wherein the metal complex compound is provided in an aqueous solution state, wherein an absorption chamber connected to the inflow path for gas containing nitrogen oxide and the metal complex compound is provided in the adsorption chamber in the aqueous solution state, wherein a first connection pipe connecting the adsorption chamber and an electrochemical cell is provided, wherein the oxidized metal complex compound bound with nitrogen oxide is transported to a nitrogen oxide collecting unit for collecting nitrogen oxide, and wherein a second connection pipe connecting the nitrogen oxide collecting unit and the electrochemical cell is provided.

6. The method of claim 5, further comprising:
a second step of oxidizing the metal complex compound bound with nitrogen oxide after the first step and separating the nitrogen oxide from the oxidized central metal ion; and
a third step of collecting the separated nitrogen oxide.

7. The method of claim 6, wherein, in the second step, the step of oxidizing the metal complex compound bound with nitrogen oxide and the step of separating the nitrogen oxide from the metal complex compound are performed at different locations.

8. The method of claim 6, further comprising:
a fourth step of reducing the oxidized metal complex compound after the second step and transporting the reduced metal complex compound to bring it into contact with the introduced gas containing nitrogen oxide.

9. The method of claim 8, wherein the first step to the fourth step are repeated a plurality of times.

* * * * *